May 20, 1924.  1,494,888

F. E. CLARK

RIM FOR ELASTIC WHEEL TIRES

Filed Sept. 27, 1922  2 Sheets-Sheet 1

Inventor
F. E. Clark
By
Lamy & Lamy, Attorneys

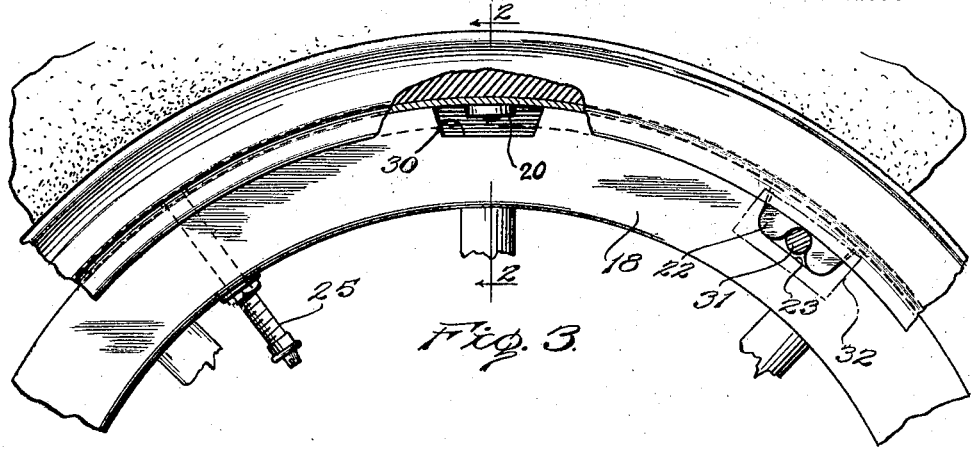
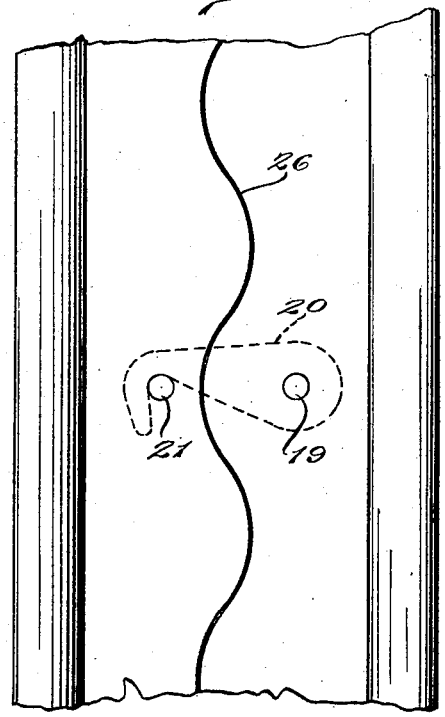
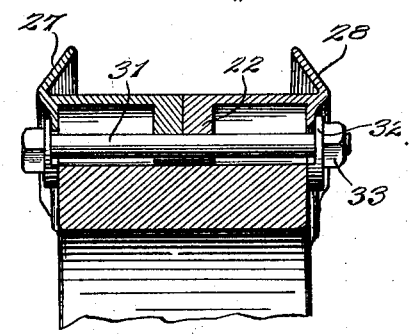

Patented May 20, 1924.

1,494,888

UNITED STATES PATENT OFFICE.

FREDRICK EUSTACE CLARK, OF HUNTINGTON, WEST VIRGINIA.

RIM FOR ELASTIC WHEEL TIRES.

Application filed September 27, 1922. Serial No. 590,869.

*To all whom it may concern:*

Be it known that I, FREDRICK E. CLARK, citizen of the United States, residing at Huntington, in the county of Cabell and State of West Virginia, have invented certain new and useful Improvements in Rims for Elastic Wheel Tires, of which the following is a specification.

My invention relates to vehicle wheels and the main object of my invention is to provide a rim for elastic tires such as solid rubber tires or pneumatic tires, this rim being detachable from the wheel without completely deflating the tire.

It is usual to split the wheel rim transversely or to make it in sections and to connect these sections circumferentially to form a complete rim. This weakens the rim considerably and it is necessary to resort to special means for rigidly securing the ends of the sections together and this again makes the rim comparatively heavy in order to obtain sufficient strength at the joints.

The rim constituting the subject matter of the present invention on the other hand has no break transversely. This rim is instead split along a central plane of a wheel between its two side flanges or in other words the rim is formed by two annular halves joined together in the middle and without interruption of its peripheries.

In the accompanying drawings one embodiment of the invention is illustrated, and Fig. 1 shows a perspective view of the rim;

Fig. 3 is a fragmentary side view and partial section of the wheel with the rim and tire assembled;

Fig. 4 is a section of a rim adapted for receiving a clincher tire, and

Fig. 5 is a fragmentary plan view of the rim which shows wavy edge connections between the halves providing a firmer grip between the two halves.

Figure 1:
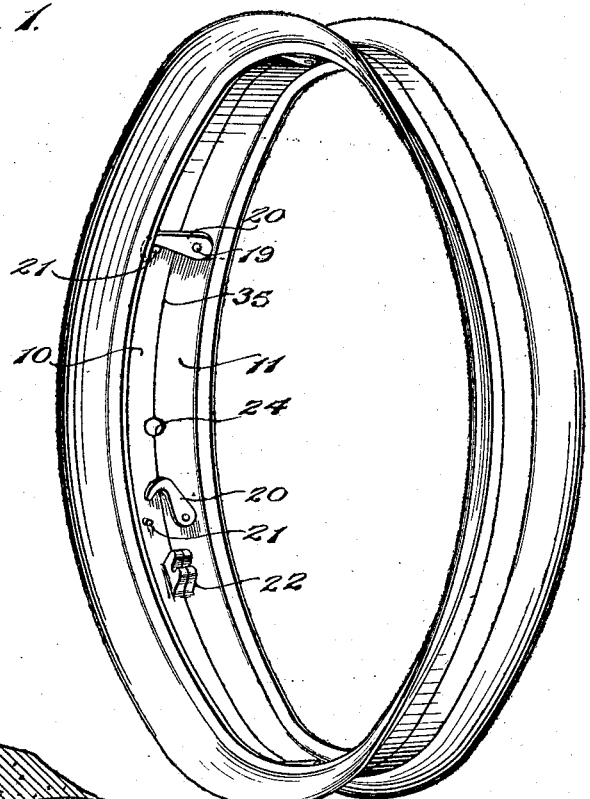
Figure 2:
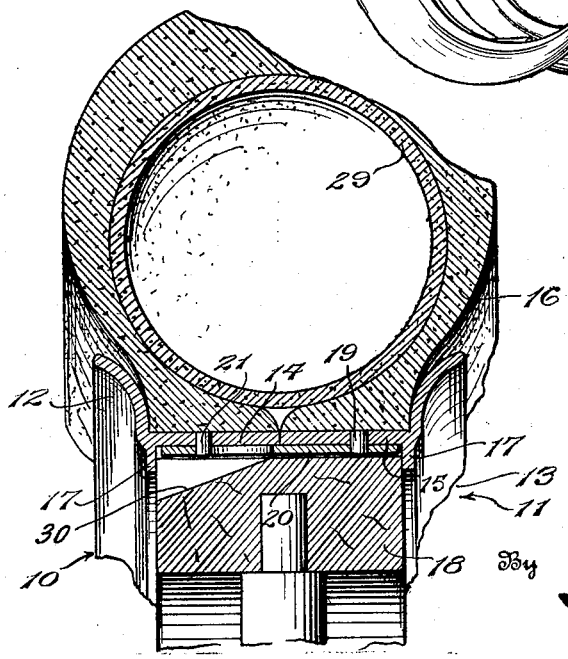
Fig. 2 is a fragmentary transverse section of a wheel with the rim and tire assembled.

As seen in Figs. 1, 2 and 3 the rim consists of two mating halves 10 and 11, each having a side flange 12 and 13 and a bottom portion 14 and 15. The bottom portions are joined along a medial line 35 situated in the central plane of the wheel and the two halves as described so far are symmetrical on both sides of this central plane. The distance between the outer flanges 12 and 13 when the rim halves are assembled is equal to the width of the tire shoe 16 intended to fit in the rim.

Each of the rim halves is provided with an inwardly directed ledge 17 between which the felly 18 of the wheel proper engages.

Around the inner periphery of the rim half 11 are pivoted as at 19 a plurality of hooks 20 equally spaced and these hooks are intended to engage corresponding studs 21 furnished in the other rim half 10 opposite to the hooks 20. At 22 is shown a lug on each of the two rim halves which lugs are intended to engage in a recess 23 formed in the felly 18, see Fig. 3. This lug is provided for the purpose of preventing the creeping of the rim around the felly.

At 24 is shown an aperture adapted to receive the air valve 25 on the pneumatic tire 29, this aperture being situated in the central plane of the wheel is formed by a semi-circular notch cut in each half of the rim.

The medial line 35 along which the two halves 10 and 11 of the rim are divided, is seen in Fig. 1 to co-incide with the central plane of the wheel, but in Fig. 5 this line 26 is shown undulated, or in other words, ridges and valleys are provided alternately along this central plane, so that in this manner the two halves obtain a more secure grip circumferentially with each other and the strain on the hooks 20 and the lugs 22 is accordingly considerably lessened.

In Fig. 4 is shown a rim adapted to be used with clincher tires and for that reason the flanges 27 and 28 are turned toward each other instead of away from each other as shown in Fig. 2.

It is evident that this rim construction is suitable both for wooden and steel wheels and that no modification is needed to fit either one.

It will be readily seen that the mounting and dismounting of the rims and pneumatic tires are considerably facilitated by this construction. The assembling of the wheel tires is preferably done in the following manner:

The inner half of the rim 11 is first placed around the felly of the wheel and pushed over the latter from the inner side thereof, care being taken that the lug 22 engages in the recess 23 provided for this purpose, this recess having to run across the felly in which it is made. The pneumatic shoe 16 together with the inner tube 29 are then pushed over the bottom 15 of the inner half 11 of the rim from the outer side of the wheel. The inner tube might be partly inflated but not more than that the air valve may be pushed through the aperture 24 in the inner half of the rim and through the corresponding opening for the same in the felly 18. The outer half 10 of the rim is now pushed over the felly in between the same and the inner periphery of the shoe 16 whereupon the hooks 20 are swung into engagement with the studs 21 in the outer half 10 of the rim. Sufficient space must be provided in the felly 18 for passing the end of the hooks 20 over the studs and for that reason a narrow slot 30 has to be provided in the outer periphery of the felly for each of the hooks 20.

The inner tube may now be fully inflated, when the tire and rim will be securely held on the felly and no creeping can take place. It is evident that the danger of rims splitting in radial direction is in this manner entirely eliminated and accidents prevented, which otherwise may be of a very serious nature if one of the rim sections should get loose when the automobile is speeding along the road.

At 31 is shown a bolt with washer 32 and nut 33 running transversely through the wooden felly in the wheel in the usual manner. This bolt engages in a notch or recess formed in the lugs 22 which makes the connection between the wheel, felly and the rim sections still more secure.

In some cases the washer 32 for the bolt 31 preferably engages the inner rim section 11 to prevent side slipping between the rim and the wheel felly, three or more bolts being provided for this purpose. The washers 32, which are preferably of square or rectangular shape, should be large enough to cover the recess 23 formed in the felly 18.

It will be evident that one of the rim sections may then be laid on the ground for assembling the pneumatic tire and the shoe or casing with the inner tube in place, will then be slipped over the inner section of the rim, whereupon the outer section is put in place last and the hooks connecting the two sections locked. The tire is thereupon inflated ready for use to be attached to the wheel felly when needed.

Having thus described the invention, what is claimed as new is:

In a wheel construction, a rim comprising two mating annular sections abutting along a medial circumferential line, each of said sections including a cylindrical bottom portion, an outwardly directed annular flange on said bottom portion adapted to engage the tire, and a narrow inwardly directed annular ledge on the inner side of said bottom portion and offset transversely with regard to said flange, said ledge being adapted to engage directly with the wheel felly, and cooperating means on the bottom portion of said sections for locking the same together and to the wheel felly; whereby the wheel felly is tightly gripped between said ledges.

In testimony whereof I affix my signature.

FREDRICK EUSTACE CLARK. [L.S.]